United States Patent Office 3,812,157
Patented May 21, 1974

3,812,157
BENZOPYRAN COMPOUNDS
Chao-Han Lin and Arthur J. Wright, Dayton, Ohio, assignors to The National Cash Register Company, Dayton, Ohio
No Drawing. Filed Mar. 31, 1972, Ser. No. 240,112
Int. Cl. C07d 7/26
U.S. Cl. 260—345.2                 7 Claims

ABSTRACT OF THE DISCLOSURE

Colorless, but colorable benzopyran compounds are disclosed, which are represented by the formula:

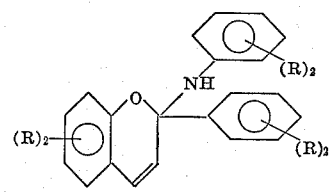

or

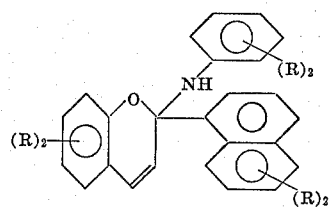

wherein each R is hydrogen, an alkyl radical having 1 to 5 carbon atoms, an alkoxy radical having 1 to 5 carbon atoms, a dialkylamino radical wherein each alkyl radical has 1 to 5 carbon atoms, an amino radical, a nitro radical or a halogen. These compounds are used in pressure-sensitive record material and in mark-forming manifold systems.

---

This invention relates to colorless, but colorable compounds. More specifically, this invention relates to certain benzopyran compounds.

These compounds are colorless or substantially colorless when in liquid solution, but are converted to dark-colored forms upon reactive contact with an acidic material. In pressure-sensitive mark-forming systems, the unreacted mark-forming components (the colorless, but colorable compound and the acidic material) and a liquid solvent in which each of the mark-forming components is soluble is disposed on or within a sheet support material. The liquid solvent is present in such form that is maintained isolated by a pressure-rupturable barrier from at least one of the mark-forming components until the application of pressure causes a breach of the barrier in the area delineated by the pressure pattern. The application of pressure brings the mark-forming components into reactive contact, thereby producing a distinctive mark.

The colors of many flowers and fruits are well known. Generally, these colors are due to the content of natural pigments. The basic structure of one such natural pigment is the flavylium nucleus:

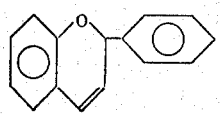

Often, this pigment is represented as a pyrylium salt, e.g. a chlorine salt:

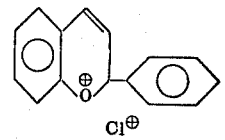

Another known compound is 7-dimethylamino-2-methoxy-2-phenyl-2(H) benzopyran represented by the structure:

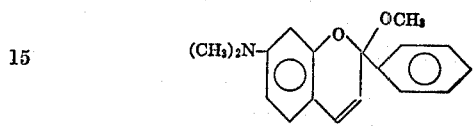

see The Journal of the American Chemical Society, vol. 86, pp. 3142–3145 (1964).

Certain colorless, but colorable benzopyran compounds now have been invented.

Accordingly, an object of this invention is to provide colorless, but colorable benzopyran compounds.

Other objects, aspects and advantages of this invention will be apparent to one skilled in the art from the following disclosure and appended claims.

The colorless, but colorable benzopyrans of this invention are represented by the formula:

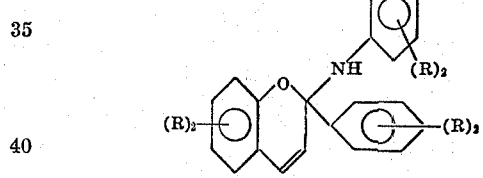

or

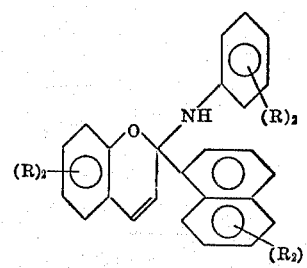

wherein each R is hydrogen, an alkyl radical having 1 to 5 carbon atoms, an alkoxy radical having 1 to 5 carbon atoms, a dialkylamino radical wherein each alkyl radical has 1 to 5 carbon atoms, an amino radical, a nitro radical or a halogen. Preferably, each R is hydrogen, an alkoxy radical having 1 to 5 carbon atoms, a dialkylamino radical wherein each alkyl radical has 1 to 5 carbon atoms, a dialkylamino radical wherein each alkyl radical has 1 to 5 carbon atoms or a halogen. Halogen as used in this invention means bromine, chlorine, fluorine or iodine. The preferred halogen is chlorine.

Specific examples of these benzopyrans are:
(a) 2 - (2,5 - dichloroanilino) - 2 - (p-methoxyphenyl)-2(H) benzopyran:

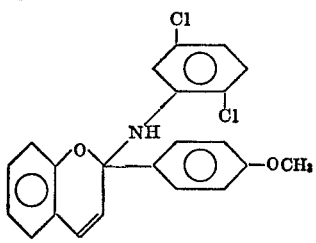

(b) 2 - (2,5 - dichloroanilino) - 2 - (3,4 - dimethoxyphenyl)-2(H) benzopyran:

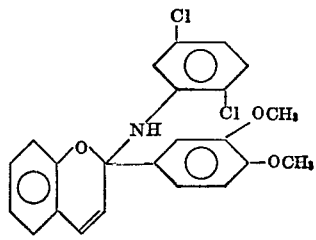

(c) 7 - dimethylamino - 2 - (2,5 - dichloroanilino)-2-(p-methoxyphenyl)-2(H) benzopyran:

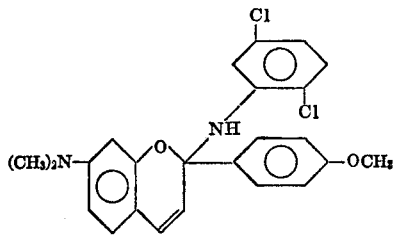

(d) 7 - dimethylamino - 2 - (2,5 - dichloroanilino)-2-phenyl-2(H) benzopyran:

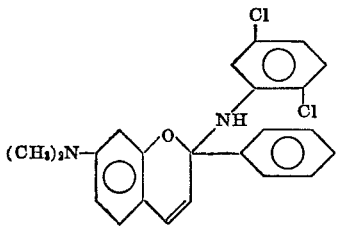

and
(e) 2 - (2,5 - dichloroanilino) - 2 - (2 - ethoxynaphthyl)-2(H) benzopyran:

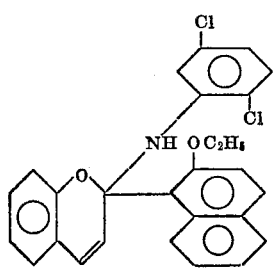

The colors developed from these compounds are blues, greens, blue-greens, reds, purples, yellows, oranges, red-oranges and the like.

In a preferred embodiment of this invention, the benzopyran and liquid solvent are encapsulated in microscopic capsules which are coated on base sheet record material. In close contact with the base sheet record material is a sensitized undersheet. The base sheet yields the benzopyran under pressure of writing against the sensitized undersheet in a pattern of droplets corresponding to the written matter, in accordance with the disclosure of such a capsule-bearing sheet in U.S. Pat. No. 2,712,507, which issued July 5, 1955, on the application of Barrett K. Green. U.S. Pat. No. 2,712,507 also discloses a preferred method of forming the capsules. Other preferred methods of preparing solvent-containing microscopic capsules are disclosed in U.S. Pat. No. 2,800,457, which issued on July 23, 1957, on the application of Barrett K. Green and Lowell Schleicher and in U.S. Pat. No. 3,041,289, which issued on June 26, 1962, on the application of Bernard Katchem and Robert E. Miller.

The encapsulated droplets are released by the rupture of capsules in writing operations. The benzopyran liquid droplets are transferred in the pattern of the data configuration to the top of the underlying sheet. The top of the underlying sheet is coated or impregnated with at least one material which is an acid reactant with respect to the benzopyran and produces color with any such component that is reactive therewith. Representative acidic coating materials are, on one hand, oil-insoluble minerals or inorganic particulate solid materials, represented by kaolin, attapulgite, silica gel, zeolites, and the like, and, on the other hand, organic polymeric acidic materials, such as acid-reacting phenolic resins of oil-soluble characteristics.

The record member consists of a base sheet or web member either of fibrous construction, such as paper, or of continuous structure, such as films of organic polymer material, carrying the color reactant in an exposed state with respect to applied liquid. The acid reactant, when of particulate nature, is arranged in intimate juxtaposition to form an apparently unbroken liquid receptive surface, yet substantially each particle individually is available for contact with applied liquid.

Polymeric materials of sufficient activity in an acid sense and suitable for use in this invention because they are oil-soluble are disclosed in a continuation application for U.S. Letters Patent Ser. No. 744,601, filed June 17, 1968, based on application for U.S. Letters Patent Ser. No. 392,404, filed Aug. 27, 1964, by Robert E. Miller and Paul S. Phillips, Jr., both now abandoned.

Among the oil-soluble organic polymeric materials suitable for use in this invention together with appropriate solvents to be used therewith, acid-reaction phenol-aldehyde and phenol-acetylene polymers, maleic acid-rosin resins partially or wholly hydrolyzed styrene-maleic anhydride copolymers and ethylene-maleic anhydride copolymers, carboxy polymethylene (Carbopol 934), and wholly or partially hydrolyzed vinyl methyl ether-maleic anhydride copolymer are specified as typical of the reactive acidic polymeric materials.

Among the phenol-aldehyde polymers found useful are members of the type commonly referred to as novolaks, which are characterized by solubility in common organic solvents and which are, in the absence of cross-linking agents, permanently fusible. Another group of useful phenol polymeric materials are alkylphenol - acetylene resins, likewise soluble in common organic solvents and possessing permanent fusibility in the absence of being treated by cross-linking materials. Generally, the phenolic polymer materials useful in practicing this invention are characterized by the presence of free hydroxyl groups and by the absence of groups, such as methylol, which tend to promote infusibility or cross-linking of the polymer, and by their solubility in organic solvents and relative insolubility in aqueous media.

A laboratory method useful in the selection of suitable phenolic resins is a determination of the infrared radiation absorption pattern of a candidate material. It has been found that phenolic resins showing an absorption in the 3200–3500 cm.$^{-1}$ region (which is indicative of the free hydroxyl groups) and not having an absorption in the 1600–1700 cm.$^{-1}$ region are suitable. The latter absorption region is indicative of the desensitization of the hydroxyl groups and consequently makes such groups unavailable for reaction with the chromogenic material to be specified.

The liquid solvent portion of this invention is capable of dissolving the mark-forming components. The solvent can be volatile or nonvolatile, and a single or multiple component solvent which is wholly or partly volatile can be used. Examples of volatile solvents useful with the benzopyran and acidic polymer mark-forming components specified are toluene, petroleum distillate, perchloroethylene, and xylene. Examples of nonvolatile solvents are high-boiling-point petroleum fractions and chlorinated diphenyls.

Generally, the solvent forming the vehicle to a large extent should be chosen so as to be capable of dissolving at least 1%, on a weight basis, of the benzopyran, preferably in excess of 2%, and a larger amount of polymeric material—up to, say 15% or more—to form an efficient reaction. However, in the preferred system, the solvent should be capable of dissolving an excess of the polymeric material, so as to provide every opportunity for maximum reaction utilization of the benzopyran and thus to assure the maximum coloration at a reaction site.

A further criterion of the selected solvent is that it must not interfere with the mark-forming reaction. In some instances, the presence of the solvent may interfere with the mark-forming reaction or diminish the intensity of the mark, in which case the solvent chosen should be sufficiently vaporizable to assure its leaving the reaction site after having, through solution, brought the mark-forming components into intimate admixture, so that the mark-forming reaction proceeds.

In the base-acid color system, as stated above, the polymeric mark-forming component(s) chosen must be acidic relative to the benzopyran compound and reactive with the benzopyran material to effect the distinctive color formation or color change.

Kaolin is generally known and used in the papermaking industry as "china clay" and is outstandingly preferable as a particulate oil-insoluble and water-insoluble mineral material of acid characteristics necessary to color the benzopyrans of this invention. A white kaolin is used, and, because of its whiteness, its plate-like particle form, which gives it unparalleled coating properties in aqueous slurries, its universal abundance in supply, its historical general usage in the papermaking and paper-converting industries, and its low cost, it is an ideal material. Other types of particulate and substantially colorless water- and oil-insoluble minerals of the necessary acid properties are deemed equivalents of kaolin, some being bentonities.

Attapulgite can be used in this invention as an efficient colorles mineral reactant material to color the benzopyrans of this invention that react on contact in an electron-donor-acceptor reaction, and, by reason of its high oil absorbency, is doubly useful as an absorbent reactant coating on paper to form color with such compounds dissolved in oil as may be applied to it.

Various methods known to the prior art and disclosed in the aforementioned application Ser. No. 392,404 to Miller et al. and U.S. Pat. No. 3,455,721, issued July 15, 1969, can be employed in coating compositions of the mark-forming materials into their supporting sheets. An example of the compositions which can be coated onto the surface of an underlying sheet of a two-sheet system to react with the capsule coating of the underside of an overlying sheet is as follows:

| Coating composition: | Percent by weight |
| --- | --- |
| Phenolic polymer mixture | 17 |
| Paper coating kaolin (white) | 57 |
| Calcium carbonate | 12 |
| Styrene butadiene latex | 4 |
| Ethylated starch | 8 |
| Gum arabic | 2 |
| | 100 |

All of the above-described materials, solvents, systems and like, except for the benzopyrans of this invention, are further described in U.S. Pat. 3,491,117.

The advantages of this invention are further illustrated by the following examples. The reactants and the proportions and other specific conditions are presented as being typical and should not be construed to limit the invention unduly.

EXAMPLE 1

Preparation of 2-(2,5-dichloroanilino)-2-(p-methoxyphenyl)-2(H)benzopyran

4'-methoxyflavylium chloride was prepared according to the method described in Helv. Chim. Acta., 34, p. 1776 (1951). Without further purification, the crude material in question (0.82 g., 3 mm.) was ground with 2,5-dichloroaniline (1.46 g., 9 mm.). The mixture turned fluid but soon solidified. It was dissolved in 30 ml. of methanol, and the red color of the solution was discharged through the dropwise addition of 10% aqueous NaOH. 100 ml. of benzene were added, and the solution washed with water. The benzene solution was concentrated to a syrup under a reduced pressure, and the latter extracted with 30 ml. of warm petroleum ether (low-boiling-point) twice. Upon the removal of the solvent in the combined extract, an oil was obtained, which upon standing crystallized, affording 1.35 g. of a crude product. The latter was washed with the solvent in question, yielding a white product, weighing 0.3 g., and melting at 111–113° C. Repeated crystallization from benzene-petroleum ether raised the melting point to 120–121° C.

The title compound was colorless in a benzene solution, and the contact of the latter with an acidic material of a phenolic resin yielded a yellow color.

EXAMPLE 2

Preparation of 2-(3,4-dimethoxyphenyl)-2-methoxy-2(H)benzopyran

3',4'-dimethoxyflavylium chloride was prepared according to the method described in Example 1 for 4'-methoxyflavylium chloride. Five grams of the material in question were mixed with 5.0 g. anhydrons sodium acetate and 100 ml. of methanol. The solution was evaporated under a reduced pressure employing a water aspirator, and the operation repeated after the addition of 100 ml. of methanol. The residue was extracted with 2 portions of benzene-methanol (19:1) of 60 ml. each. The extracts were combined, precipitated with petroleum ether to remove a red substance, filtered and the filtrate concentrated to a syrup under a reduced pressure. The latter was dissolved in 50 ml. of benzene, precipitated with petroleum ether, and the filtrate concentrated again. The residue was dissolved in 10 ml. of benzene, mixed with about 20 ml. of petroleum ether, seeded and allowed to crystallize. The crude product weighed 1.4 g., melting at 90–94° C. Repeated crystallization from benzene-petroleum ether afforded a pure color reactant, melting at 118–119° C. A benzene solution of the compound yielded an orange color upon contact with a sensitized sheet coated with a phenolic resin.

EXAMPLE 3

Preparation of 2-(2,5-dichloroanilino)-2-(3,4-dimethoxyphenyl)-2(H) benzopyran

3',4'-dimethoxyflavylium chloride (4.1 g.) prepared in Example 2 was reacted with 7.3 g. of 2,5-dichloroaniline according to the procedure given in Example 1. The product melted at 120–122° C., and exhibited a weight of 1.2 g. A benzene solution of the product produced an orange color upon contact with a sensitized sheet coated with a phenolic resin.

EXAMPLE 4

Preparation of 7-dimethylamino-2-(2,5-dichloroanilino)-2-phenyl-2(H)-benzopyran 7-dimethylaminoflavylium chloride was prepared according to the method described in Example 2. It was reacted with 2,5-dichloroaniline following the procedure described in Example 1, affording a color reactant melting at 167–168° C. A benzene solution of the compound yielded a red color upon contact with a sensitized sheet coated with a phenolic resin.

EXAMPLE 5

Preparation of 7-dimethylamino-2-(2,5-dichloroanilino)-2-(p-methoxyphenyl)-2(H)-benzopyran The preparation of the title color reactant followed that described in Example 4 except for the starting flavylium compound, i.e., 7-dimethylamino-4'-methoxyflavylium chloride. The product melted at 129–130° C. A benzene solution of the color reactant yielded a reddish-purple color upon contact with a sensitized sheet coated with a phenolic resin.

EXAMPLE 6

Preparation of 2-(2,5-dichloroanilino)-2-(2-ethoxynaphthyl)-2(H) benzopyran 2-(2-ethoxynaphthyl)-benzopyrylium chloride was prepared from coumarin and 2-ethoxynaphthylene in the presence of zinc chloride and phosphoryl chloride by the usual method. It was reacted with 2,5-dichloroaniline according to the procedure given in Example 1, affording a color reactant, melting at 119–122° C. A benzene solution of this color reactant produced a red color upon contact with a sensitized sheet coated with a phenolic resin.

Although this invention has been described in considerable detail, it must be understood that such detail is for the purposes of illustration only and that many variations and modifications can be made by one skilled in the art without departing from the scope and spirit thereof.

What is claimed is:
1. A compound of the formula:

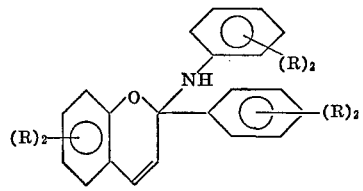

or

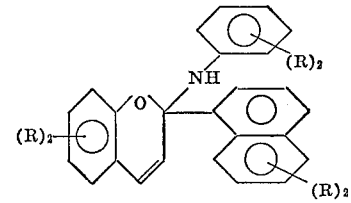

wherein each R is hydrogen, an alkyl radical having 1 to 5 carbon atoms, an alkoxy radical having 1 to 5 carbon atoms, a dialkylamino radical wherein each alkyl radical has 1 to 5 carbon atoms, an amino radical, a nitro radical or a halogen.

2. A compound according to claim 1 wherein each R is hydrogen, an alkoxy radical having 1 to 5 carbon atoms, a dialkylamino radical wherein each alkyl radical has 1 to 5 carbon atoms or a halogen.

3. A compound according to claim 1 wherein said compound is 2-(2,5 - dichloroanilino)-2-(p-methoxyphenyl)-2(H) benzopyran.

4. A compound according to claim 1 wherein said compound is 2-(2,5 - dichloroanilino) - 2 - (3,4-dimethoxyphenyl)-2(H) benzopyran.

5. A compound according to claim 1 wherein said compound is 7 - dimethylamino - 2 - (2,5 - dichloroanilino)-2-(p-methoxyphenyl)-2(H) benzopyran.

6. A compound according to claim 1 wherein said compound is 7 - dimethylamino - 2 - (2,5 - dichloroanilino)-2-phenyl-2(H) benzopyran.

7. A compound according to claim 1 wherein said compound is 2 - (2,5 - dichloroanilino) - 2 - (2-ethoxynaphthyl)-2(H) benzopyran.

References Cited
UNITED STATES PATENTS
3,518,273   6/1970   Von Strandtmann __ 260—345.2

JOHN M. FORD, Primary Examiner

U.S. Cl. X.R.

117—36.2; 260—345.5